United States Patent
Miyasaka et al.

(10) Patent No.: US 6,789,759 B2
(45) Date of Patent: Sep. 14, 2004

(54) SPINNING REEL FOR FISHING

(75) Inventors: Shinichiro Miyasaka, Saitama (JP); Tetsuya Shimozaki, Tokyo (JP); K.C. Cheung, Vancouver (CA); Danny S. C. Yuen, Vancouver (CA)

(73) Assignees: Daiwa Seiko, Inc., Tokyo (JP); Hotec Industries Canada Ltd., Vancouver (CA)

( * ) Notice: Subject to any disclaimer, the term of this patent is extended or adjusted under 35 U.S.C. 154(b) by 0 days.

(21) Appl. No.: 10/668,238

(22) Filed: Sep. 24, 2003

(65) Prior Publication Data

US 2004/0075004 A1 Apr. 22, 2004

(30) Foreign Application Priority Data

Sep. 25, 2002 (JP) ..................... P2002-279663

(51) Int. Cl.[7] .............................................. A01K 89/01
(52) U.S. Cl. .................................. 242/321; 242/320
(58) Field of Search ........................... 242/321, 320, 242/322, 241, 242

(56) References Cited

U.S. PATENT DOCUMENTS 5,697,567 A * 12/1997 Sonenvald ................. 242/322
5,871,165 A * 2/1999 Shinohara et al. .......... 242/321

FOREIGN PATENT DOCUMENTS

| JP | 2530523 Y2 | 12/1996 |
| JP | 2003-134974 A | 5/2003 |
| JP | 2003-189768 A | 7/2003 |

* cited by examiner

Primary Examiner—Kathy Matecki
Assistant Examiner—Evan H Langdon
(74) Attorney, Agent, or Firm—Sughrue Mion, PLLC

(57) ABSTRACT

A spinning reel for fishing includes: a reel body; a pinion rotated in response to a rotation of a handle; a rotary cylinder shaft integrally rotated with a rotor including a fishing line guide portion, the rotary cylinder shaft being rotatably supported in the reel body; a spool shaft including a spool at an end portion thereof, the spool shaft being inserted into the rotary cylinder shaft so that so that the spool shaft can be reciprocated in an axial direction thereof; a recessed portion formed in the axial direction on an inner circumference side of the rotary cylinder shaft; and a pair of rolling bearings arranged so as to be separated from each other in the axial direction between the recessed portion and an outer circumferential face of the spool shaft.

6 Claims, 2 Drawing Sheets

SPINNING REEL FOR FISHING

BACKGROUND OF THE INVENTION

The present invention relates to a spinning reel for fishing by which a fishing line is wound round a spool via a fishing line guide portion when a rotor having the fishing line guide portion is rotated and the spool is reciprocated in the longitudinal direction at the same time by rotating a handle connected to a winding drive mechanism of the reel body.

Generally, a spinning reel for fishing is composed in such a manner that a spool shaft is reciprocated in the longitudinal direction while a rotor is being rotated under the condition that the spool shaft, to the forward end portion of which a spool is attached, is given a load, and a fishing line is reeled in via a fishing line guide portion of the rotor. The rotor is driven via a pinion (a rotary cylinder shaft on which a pinion is formed) meshed with a face gear attached to a handle shaft, and the spool shaft to which the spool is attached is reciprocated in the longitudinal direction by an oscillating mechanism under the condition that the spool shaft is inserted into the rotary cylinder shaft. Therefore, between the inner circumferential face of the rotary cylinder shaft rotated integrally with the rotor, and the outer circumferential face of the spool shaft reciprocated in the rotary cylinder shaft, both the frictional resistance in the rotating direction and the frictional resistance in the reciprocating direction are given. Accordingly, a light winding operation cannot be performed, and abrasion tends to occur. Furthermore, the guiding property (the guiding property with respect to rotary and longitudinal motions) is lowered.

In order to solve the above problems, the following structure is proposed. Between the inner circumferential face of the rotary cylinder shaft having a pinion and the outer circumferential face of the spool shaft, rolling members are provided so that the spool shaft can be guided on the inner circumferential face of the rotary cylinder shaft by rolling. In this way, frictional resistance is reduced in the case of both the rotation and the reciprocation in the longitudinal direction. Japanese Utility Model Registration No. 2530523 discloses such a structure, for example.

However, according to the above related art, the following problems may be encountered. Since it is composed in such a manner that a plurality of steel balls are provided between the outer circumferential face of the spool shaft and the inner circumferential face of the rotary cylinder shaft, frictional resistance can be reduced in both cases of the rotation and the reciprocation in the longitudinal direction, however, the balls are guided being rolled while the balls are pressed in point contact with the outer circumferential face of the spool shaft and the inner circumferential face of the rotary cylinder shaft. Therefore, the outer circumferential face of the spool shaft and the inner circumferential face of the rotary cylinder shaft tend to be locally worn away and deformed.

Further, in the case where a load is given, there is a tendency that the balls are not equally contacted with the faces. Therefore, guiding can not be uniformly conducted by the rolling balls.

Furthermore, in the case where the spinning reel is put into practical use, the rolling members are affected by the intrusion of sea water and foreign objects. Therefore, it is difficult for the rolling members to smoothly roll between the faces. Accordingly, a stable rolling guiding performance cannot be maintained.

SUMMARY OF THE INVENTION

The present invention has been accomplished to solve the above problems. It is an object of the present invention to provide a spinning reel for fishing characterized in that: the outer circumferential face of the spool shaft and the inner circumferential face of the rotary cylinder shaft can be stably supported; the durability is high; and the winding operation of a fishing line can be lightly performed.

In order to solve the aforesaid object, the invention is characterized by having the following arrangement.

Aspect 1.

A Spinning Reel for Fishing Comprising a reel body;

a pinion rotated in response to a rotation of a handle;

a rotary cylinder shaft integrally rotated with a rotor including a fishing line guide portion, the rotary cylinder shaft being rotatably supported in the reel body;

a spool shaft including a spool at an end portion thereof, the spool shaft being inserted into the rotary cylinder shaft so that so that the spool shaft can be reciprocated in an axial direction thereof;

a recessed portion formed in the axial direction on an inner circumference side of the rotary cylinder shaft; and a pair of rolling bearings arranged so as to be separated from each other in the axial direction between the recessed portion and an outer circumferential face of the spool shaft.

Aspect 2. The spinning reel according to the aspect 1, wherein the recessed portion is formed on a front side of the spool shaft with respect to an engaging portion engaged with a drive gear on a handle shaft.

Aspect 3. The spinning reel according to the aspect 1, wherein a sleeve is interposed between the rolling bearing and the outer circumferential face of the spool shaft.

Aspect 4. The spinning reel according to the aspect 3, wherein the sleeve is made of material of low sliding resistance.

Aspect 5. The spinning reel according to the aspect 1, wherein an outer circumferential portion of the rotary cylinder shaft is rotatably supported by the reel body through rolling bearings separately arranged in the axial direction.

Aspect 6. The spinning reel according to the aspect 1, wherein a collar member is interposed between the pair of rolling bearings in the axial direction to prevent the pair of rolling bearing from approaching each other.

DETAILED DESCRIPTION OF PREFERRED EMBODIMENTS

Figure 1:
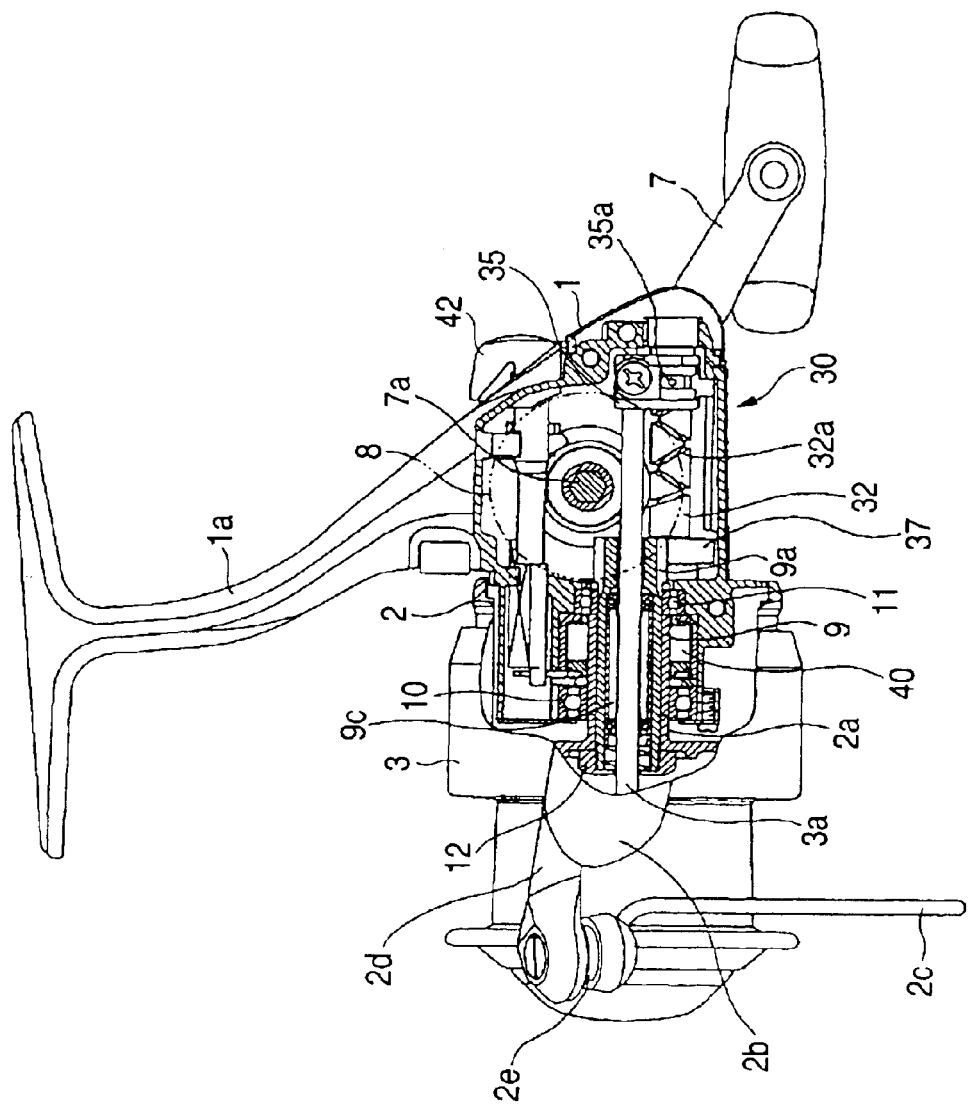
FIG. 1 is a view showing an embodiment of the spinning reel for fishing of the present invention.
Figure 2:
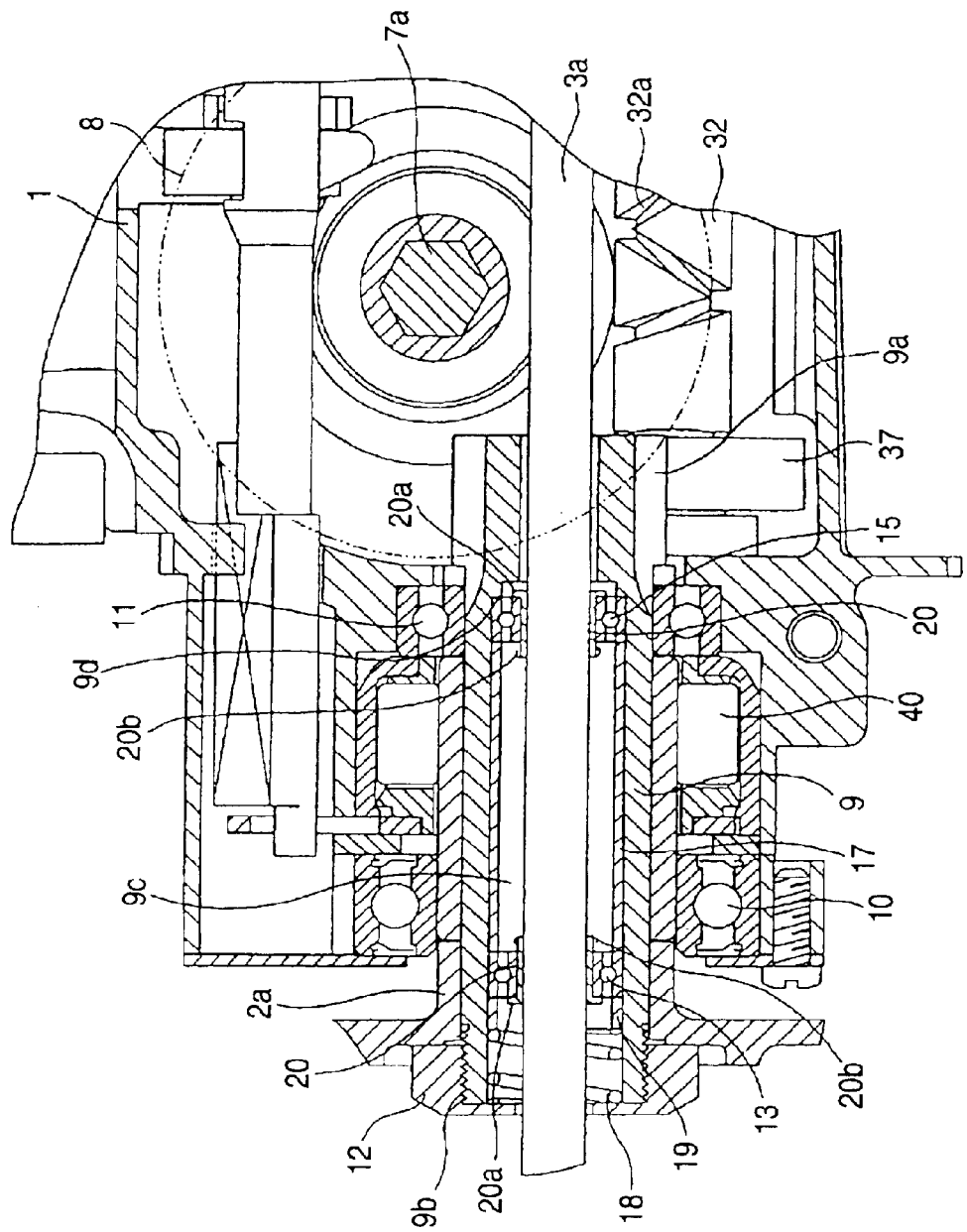
FIG. 2 is an enlarged view showing a primary portion of the spinning reel for fishing shown in FIG. 1.

FIGS. 1 and 2 are views showing an embodiment of the present invention. FIG. 1 is an overall arrangement view of the spinning reel for fishing, and FIG. 2 is an enlarged view of the primary portion of FIG. 1.

In a reel body 1 of the spinning reel, a reel leg 1a attached to a fishing rod is integrally formed. In the front portion of the reel body 1, a rotor 2 rotatably supported and a spool 3 supported to be capable of moving in the longitudinal direction synchronously with the rotational motion of the rotor 2 are provided.

The handle shaft 7a is pivotally supported by the reel body 1. The handle 7 is attached to the protruding end portion of the handle shaft 7a. The handle shaft 7a is engaged with a winding drive mechanism. This winding drive mechanism includes: a drive gear (face gear) 8 attached to the handle shaft 7a, having inner teeth; a pinion 9a meshed with this drive gear 8; and a rotary cylinder shaft 9 extending in the direction perpendicular to the handle shaft 7a, having a cavity portion inside extending in the axial direction.

The rotary cylinder shaft 9 is pivotally supported in the reel body 1 via the rolling bearings 10, 11 which are separately arranged from each other in the axial direction. The spool shaft 3a which extends in the direction perpendicular to the handle shaft 7a and has the spool 3 on the forward end side is inserted into the cavity portion of the rotary cylinder shaft 9 so as to be movable in the axial direction. The central support portion 2a of the rotor 2 is nonrotatably engaged with the forward end portion of the rotary cylinder shaft 9. When the male screw portion 9b formed on the outer circumference of the rotary cylinder shaft 9 is screwed to the nut member 12, the rotor 2 and the rotary cylinder shaft 9 are fixed to each other being capable of rotating integrally with each other.

On the inner circumferential side of the rotary cylinder shaft 9, that is, on the inner circumference of the cavity portion, a recess portion 9c extending in the axial direction from the spool side to the reel body side is provided. This recess portion 9c is formed being extended to a portion close to the spool side front position of the meshing portion in which the pinion 9a is meshed with the drive gear 8. At the front and the rear positions in the axial direction between this recess portion 9c and the outer circumferential face of the spool shaft 3a, rolling bearings 13 and 15 are disposed with being separated from each other. Each bearing 13, 15 includes an inner races coming into contact with the outer circumferential face of the spool shaft, an outer race coming into contact with the inner circumferential face of the rotary cylinder shaft 9 and bearing members interposed between the inner race and the outer race.

The rolling bearings 13, 15 are positioned by an axial direction positioning device. Therefore, the rolling bearings 13, 15 are maintained in the state in which they are separate from each other in the axial direction. In this case, the axial direction positioning device according to this embodiment is composed in such a manner that the rolling bearing 15 comes into contact with the end portion 9d of the recess portion 9c formed in the rotary cylinder shaft 9, the collar member 17 is arranged between the rolling bearings, and the rolling bearing 13 is pushed toward the reel body side by the spring 18 through the collar member 19, which are interposed between the rolling bearing 13 and the nut member 12.

In this connection, it is preferable that the sleeve 20 made of material of low sliding resistance is interposed between each rolling bearing 13, 15 and the outer circumferential face of the spool shaft 3a. Examples of the material of low sliding resistance are: synthetic resins such as polyacetal (POM) and polyphenylene sulfide (PPS); carbon materials; ceramics; and non-ferrous metals. An annular protruding portion 20a and protrusions 20b for press-fitting which protrudes in the circumferential direction at predetermined intervals are provided at opposite end portions of the respective sleeve 20, so that the sleeve 20 is prevented from moving in the axial direction when the spool shaft 3a slides in the axial direction.

The pinion 9a is engaged with the spool reciprocating device 30 for reciprocating the spool 3 (spool shaft 3a) in the longitudinal direction.

This spool reciprocating device 30 is rotatably supported by the reel body. The spool reciprocating device 30 includes: a worm shaft 32 extending in parallel with the spool shaft 3a; a sliding piece 35 fixed and locked to the base end portion of the spool shaft 3a, which holds the pin 35a which engages with the spiral groove 32a formed on the outer circumferential face of the worm shaft 32; and a gear 37 attached to the end portion of the worm shaft 32, being meshed with the pinion 9a.

One-way clutch 40 is attached to the middle portion of the rotary cylinder shaft 9. When the lever 42 attached to the outside of the reel body 1 is operated and rotated, the one-way clutch is activated so that a reverse rotation of the handle 7 is prevented.

The rotor 2 is provided with a pair of arm portions 2b rotating round the spool 3. At the forward end portion of each arm portions 2b, the bail support member 2d, to which the base end portion of the bail 2c is attached, is turnably supported so that it can be freely turned between the fishing line winding position and the fishing line casting position. In this connection, one base end portion of the bail 2c is attached to the fishing line guide portion 2e integrally provided in the bail support member 2d.

In the above constitution, when the handle 7 is operated being wound, the rotor 2 is rotated via the drive gear 8 and the pinion 9a (rotary cylinder shaft 9). Concerning the spool 3, the spool shaft 3a is reciprocated in the longitudinal direction sliding in the rotary cylinder shaft 9 via the spool reciprocating device 30. Therefore, the fishing line is equally wound round the spool 3 via the fishing line guide portion 2e.

When the rolling bearings 13, 15 are separately arranged from each other at the front and the rear position in the axial direction between the outer circumferential face of the spool shaft 3a and the inner circumferential face of the rotary cylinder shaft 9, both can be stably supported, and it is possible to provide an excellent rolling guiding action in the rotary direction of the rotary cylinder shaft 9 with respect to the spool shaft 3a, so that winding operation can be lightly performed. Since the rolling bearings 13, 15 are made into a unit and the rolling members do not directly come into pressure-and-point-contact with the outer circumferential face of the spool shaft and the inner circumferential face of the rotary cylinder shaft, there is no fear that the outer circumferential face of the spool shaft and the inner circumferential face of the rotary cylinder shaft are locally worn away and deformed. Therefore, the durability can be enhanced.

In the above constitution, since the recess portion 9c of the rotary cylinder shaft 9c is formed on the front side of the spool of the meshing portion of the pinion 9a with the drive gear 8 and the rolling bearings 13, 15 are intensively arranged on the spool side, it is possible to reduce the length of the rotary cylinder shaft 9 in the axial direction. Therefore, it is possible to prevent the size of the reel body from increasing. Further, since the rolling bearings 13, 15 can be incorporated into the rotary cylinder shaft 9 in one direction, the workability can be enhanced.

Due to the structure in which the sleeve 20 is interposed between the rolling bearings 13, 15 and the outer circumferential face of the spool shaft 3a, the material directly coming into contact with the outer circumferential face of the spool shaft 3a can be selected from materials of low sliding resistance. Further, it is possible to obtain an aligning action of the spool shaft 3a with the rotary cylinder shaft 9. Accordingly, it is possible to provide a stable rolling guide action and a stable longitudinal movement guiding action.

Furthermore, in the above constitution, the outer circumferential portion of the rotary cylinder shaft 9 is rotatably supported by the reel body 1 via the bearings 10, 11 which are separately arranged from each other in the axial direction, and the inner and the outer circumference of the rotary cylinder shaft 9 are supported by the rolling bearings. Accordingly, frictional resistance can be greatly reduced under the condition that a load is given. Therefore, winding operation, in which the rotor is rotated and the spool is reciprocated in the longitudinal direction, can be smoothly performed.

The embodiment of the present invention is explained above. However, it should be noted that the present invention is not limited to the specific embodiment illustrated in the drawings. The present invention can be applied to various types of spinning reels for fishing.

According to the present invention, it is possible to provide a spinning reel for fishing in which the outer circumferential face of the spool shaft and the inner circumferential face of the rotary cylinder shaft can be stably supported; the durability is high; and the winding operation can be lightly performed.

What is claimed is:

1. A spinning reel for fishing comprising:

a reel body;

a pinion rotated in response to a rotation of a handle;

a rotary cylinder shaft integrally rotated with a rotor including a fishing line guide portion, the rotary cylinder shaft being rotatably supported in the reel body;

a spool shaft including a spool at an end portion thereof, the spool shaft being inserted into the rotary cylinder shaft so that so that the spool shaft can be reciprocated in an axial direction thereof;

a recessed portion formed in the axial direction on an inner circumference side of the rotary cylinder shaft; and a pair of rolling bearings arranged so as to be separated from each other in the axial direction between the recessed portion and an outer circumferential face of the spool shaft.

2. The spinning reel according to claim 1, wherein the recessed portion is formed on a front side of the spool shaft with respect to an engaging portion engaged with a drive gear on a handle shaft.

3. The spinning reel according to claim 1, wherein a sleeve is interposed between the rolling bearing and the outer circumferential face of the spool shaft.

4. The spinning reel according to claim 3, wherein the sleeve is made of material of low sliding resistance.

5. The spinning reel according to claim 1, wherein an outer circumferential portion of the rotary cylinder shaft is rotatably supported by the reel body through rolling bearings separately arranged in the axial direction.

6. The spinning reel according to claim 1, wherein a collar member is interposed between the pair of rolling bearings in the axial direction to prevent the pair of rolling bearing from approaching each other.

* * * * *